United States Patent Office 3,216,921
Patented Nov. 9, 1965

3,216,921
CANDLE COMPOSITION
Richard C. Fox, San Rafael, Calif., assignor to California Research Corporation, San Francisco, Calif., a corporation of Delaware
No Drawing. Filed July 29, 1964, Ser. No. 386,051
3 Claims. (Cl. 208—21)

This application is a continuation-in-part of Richard C. Fox U.S. application Serial No. 724,927, filed March 31, 1958, now abandoned.

This invention is directed to a blended wax composition, particularly suitable for the formation of wax candles.

The performance properties of candles are highly dependent on the composition of the wax used in their manufacture. This is true whether the candles are dipped tapered candles, molded water-cooled candles, or mottled block candles. In the manufacture of dipped tapered candles, the wax compositions are applied layer upon layer. It is of vital importance that proper adhesion exists between the layers of wax. If adhesion between layers is poor, the final product is easily separated into concentric cylinders when the candle is broken. Also, still more important, improper adhesion between the layers causes large blisters to appear in or on the candle during manufacture or upon storage. Such blisters mar the beauty of the candle because when viewed by reflected light, such blisters are light colored, and when viewed by transmitted light, such blisters appear as dark spots in the candle. Furthermore, because tapered candles are usually long, thin cylinders, they are prone to break easily. Wax modifiers (e.g., a fatty acid such as stearic acid) often are added to wax compositions to obviate the above disadvantages. However, such modifiers tend to affect the melting points of the resulting wax compositions.

Because of their very nature, it is expected that candles burn properly (that is, that there must be no dripping, smoking, or inordinately large flame size); that they are of sufficient strength to resist bending and to avoid deformation; and that they are made from waxes which are pure white or colorless.

Thus, it is a prime object of this invention to set forth a paraffin wax composition which can be used in the formation of dipped tapered candles and molded water-cooled candles, avoiding the detrimental effects set forth hereinabove, and having the requirements necessary for the manufacture of candles.

According to this invention, it has been discovered that paraffin wax compositions particularly desirable for the manufacture of candles can be obtained with a blend of waxes consisting of a low melting distillate wax and a high melting distillate wax.

The wax compositions described herein are useful not only for the manufacture of candles; such compositions can also be used in the coating of containers, such as milk cartons, etc.

The wax compositions herein comprise 60 to 95% by weight of a low melting distillate wax having a melting point in the range of 125° to 135° F. AMP, and from 40 to 5% by weight of a high melting distillate wax having a melting point greater than about 150° F. AMP, preferably from 150° to 170° F. AMP. Particularly desirable wax compositions comprise those containing from 90% by weight of a wax having a melting point range of about 125° to 135° F. AMP and 10% by weight of a wax having a melting point greater than 150° F. AMP; and those wax compositions containing 80% by weight of a wax having a melting point range of 125° to 135° F. AMP and 20% by weight of a wax having a melting point greater than 150° F. AMP. (The term AMP refers to American Melting Point, as defined in ASTM D87–42.)

The low melting wax component, which can be present in the composition in an amount of about 60 to 95% by weight, can be straight-chain, branched-chain, or naphthenic hydrocarbons. Although the high melting wax may consist of a mixture of hydrocarbon types, it is desirable for certain particular applications that principally straight-chain hydrocarbons be present.

The types of hydrocarbons in a wax can be characterized by the melting point-refractive index relationship. Considering wax compositions having a given melting point, the compositions made up solely of straight-chain hydrocarbons will have the lowest refractive index. As the percentage of branched-chain or naphthenic hydrocarbons increases, the refractive index of the composition increases. The difference between (1) the refractive index of the wax and (2) the refractive index of the normal or the hypothetical normal hydrocarbon having the same melting point can be used to characterize wax compositions. It is convenient to express this characterization factor as 10,000 x the refractive index difference. Thus $K_w = 10,000 \ (N_w - N_p)$ wherein $K_w$=the characterization factor, $N_w$=the refractive index of the wax measured at 80° C., and $N_p$=the refractive index at 80° C. of the normal paraffin having the same melting point as the wax.

In the preferred embodiment of this invention, it is desirable that the characterization factor of the high melting wax component has a value less than 75. Because of the improvement obtained therefrom, it is more particularly preferred that the high melting wax has a characterization factor in the range of 10 to 35.

Table I hereinbelow sets forth data on blends of wax compositions which illustrate the compositions suitable for the manufacture of wax for candles according to the present invention.

TABLE I

| Composition, Percent By Weight | 1 | 2 | 3 | 4 | 5 | 6 | 7 | 8 | 9 | 10 |
|---|---|---|---|---|---|---|---|---|---|---|
| Refined wax 125/130 AMP | 100 | | | | | 90 | 80 | | | 50 |
| Refined wax 128/130 AMP | | 100 | | | | | | 80 | 80 | |
| Refined wax 143/150 AMP | | | 100 | | | | | | | 50 |
| Refined wax 150/155 AMP | | | | 100 | | 10 | | 20 | 20 | |
| Refined wax 160/165 AMP | | | | | 100 | | 20 | 20 | | |
| Physical Properties: | | | | | | | | | | |
| Melting point, AMP, °F | 129.5 | 129.2 | 144.5 | 152.5 | 162 | 129.8 | 134.8 | 132.4 | 130.1 | 136 |
| Characterization factor, $K_w$ | 48 | 4 | 23 | 58 | 37 | 54 | 51 | 23 | 29 | 40 |
| Tensile strength, p.s.i. at 73° F | 320 | 62 | 320 | 292 | 250 | 273 | 335 | 314 | 270 | |
| Modulus of rupture, 73° F | 430 | 149 | 460 | 400 | 340 | 460 | 470 | 355 | 420 | |
| Resistance to thermal shock | (²) | (³) | (³) | | | (¹) | (¹) | (²) | (¹) | |
| Adhesion between layers | Good | Poor | Poor | Good | Poor | Good | Good | Good | Good | Fair |
| Bending resistance | Poor | Good | Good | Good | Good | Poor | Poor | Good | Good | Poor |
| Penetration at 77° F., ASTM D5-61 | 19.5 | 9 | 15.5 | 17 | 11.8 | 21.6 | 18.4 | 11 | 11.5 | 16.5 |

¹ Excellent. ² Average. ³ Below average.

The tensile strength was determined by the ASTM Method D1320–54T modified to the extent that a Perkins Tester was used. A sample of the molten wax (230° F.) to be tested was poured into a brass mold to give a dumbbell-shaped specimen having a cross-section area of ¼ sq. in. at the center. The specimen was maintained at room temperature for 2 hours, after which it was placed in the jaws of the tensile tester. The lower jaw on the Perkins Tester moved downward at the rate of 2.5 inches per minute. The force required to break the specimen was noted, and the tensile strength was recorded in pounds per square inch. The final recorded value is the average of test results obtained with six samples of the same wax composition.

The modulus of rupture was obtained by pouring a sample of molten wax into a pan of hot water to give a wax slab 0.15 inch thick. Specimens 0.5″ x 3″ were cut from this slab and placed on supports two inches apart in a modulus of rupture testing device. A force was applied to the center of the test specimen at the rate of 18 ounces per minute. The mass in grams required to break the specimen was recorded. The modulus of rupture then was calculated by the formula $$MR = \frac{(0.0066)(A)}{(B^2)(C)}$$

wherein $A$ = mass in grams required to break specimen,
$B$ = thickness of specimen in inches, and
$C$ = width of specimen in inches.

As used herein, the term "refined wax" means a wax derived from a petroleum distillate having an oil content of 0.5% or less as determined by ASTM D721–56T, and a color no darker than +25 as determined by ASTM D156–53T.

Resistance to thermal shock is defined as the ability of a wax or a wax film at room temperature to be cooled rapidly to 32° F. without cracking or fracturing.

Adhesion between layers is the ability of dipped tapered candles to withstand normal handling and temperature changes without forming blisters or other defects caused by rupture of the bond between adjacent layers of wax.

Bending resistance is the ability of dipped tapers to resist bending at temperatures of 90° F. The test is made by clamping one end of the taper to a ringstand and supporting it in a horizontal position. The tendency for the candle to bend with time at the test temperature then is observed.

Typical waxes used for dipped tapers give only fair bending resistance and adhesion between layers. However, with our composition good ratings on both properties can be obtained.

As shown by the test results on the compositions of the present invention, it is preferable that the characterization factor of the candle wax composition not be over 35 in order to provide "good" bend resistance properties essential for candles. Furthermore, excessively high values for the modulus of rupture, that is, in excess of 450, may result in poor bending resistance. For obvious reasons, the formation of dipped and molded candles necessitates that the melting point of the composition should not be too high, preferably not exceeding 135° F. AMP. Also the penetration value of the low melting point component should not be over 12 in order that the penetration of the final composition be maintained below 15, preferably below 13. Waxes of such penetration values are necessary for compositions having good bend resistant properties, yet desirably low melting points.

While the character of this invention has been described in detail with numerous examples, this has been done by way of illustration only and without limitation of the invention. It will be apparent to those skilled in the art that numerous modifications and variations of the illustrative examples may be made in the practice of the invention within the scope of the following claims.

I claim:
1. A wax composition useful in the manufacture of candles consisting essentially of about 80% by weight of a distillate wax having a melting point in the range of 128° to 130° AMP and about 20% by weight of a distillate wax having a melting point in the range of about 160° to 165° F. AMP, and having a characterization factor of from 10 to 35, said composition having a minimum ASTM tensile strength value of 270 p.s.i. at 73° F.

2. A wax composition useful in the manufacture of candles consisting essentially of about 80% by weight of a distillate wax having a melting point in the range of 128° to 130° F. AMP and about 20% by weight of a distillate wax having a melting point in the range of about 150° to 155° F. AMP, and having a characterization factor of from 10 to 35, said composition having a minimum ASTM tensile strength value of 270 p.s.i. at 73° F.

3. A wax composition useful in the manufacture of candles consisting essentially of about 80% to 90% by weight of a distillate wax having a melting point in the range of 125° to 130° AMP and about 10% to 20% by weight of a distillate wax having a melting point in the range of about 150° to 165° F. AMP, and having a characterization factor of from 10 to 35, said composition having a minimum ASTM tensile strength value of 276 p.s.i. at 73° F.

References Cited by the Examiner
UNITED STATES PATENTS

| | | | |
|---|---|---|---|
| 2,157,625 | 5/39 | Page | 208—21 |
| 2,825,635 | 3/58 | Dooley et al. | 208—21 |
| 2,906,443 | 9/59 | Harvey et al. | 208—21 |

ALPHONSO D. SULLIVAN, *Primary Examiner.*